United States Patent
D'Aquila

(10) Patent No.: US 10,203,418 B2
(45) Date of Patent: Feb. 12, 2019

(54) METHOD FOR ESTIMATING THE POSITION OF A PORTABLE DEVICE

(71) Applicant: GIPSTECH S.R.L., Rende (CS) (IT)

(72) Inventor: Gaetano D'Aquila, Cosenza (IT)

(73) Assignee: GIPSTECH S.R.L., Rende (CS) (IT)

( * ) Notice: Subject to any disclaimer, the term of this patent is extended or adjusted under 35 U.S.C. 154(b) by 209 days.

(21) Appl. No.: 15/113,416

(22) PCT Filed: Jan. 21, 2015

(86) PCT No.: PCT/IT2015/000008
§ 371 (c)(1),
(2) Date: Jul. 21, 2016

(87) PCT Pub. No.: WO2015/111089
PCT Pub. Date: Jul. 30, 2015

(65) Prior Publication Data
US 2017/0010364 A1    Jan. 12, 2017

(30) Foreign Application Priority Data

Jan. 21, 2014 (IT) .............................. CS2014A0002

(51) Int. Cl.
*G01S 19/48* (2010.01)
*G01S 19/50* (2010.01)

(52) U.S. Cl.
CPC ............... *G01S 19/48* (2013.01); *G01S 19/50* (2013.01)

(58) Field of Classification Search
CPC ....................................................... G01S 19/48
USPC ......... 342/357.31, 419, 450–452; 455/456.3, 455/457; 701/469
See application file for complete search history.

(56) References Cited

U.S. PATENT DOCUMENTS

| | | | |
|---|---|---|---|
| 5,895,436 A | 4/1999 | Savoie | |
| 2013/0053062 A1 | 2/2013 | Kim | |

FOREIGN PATENT DOCUMENTS

| | | |
|---|---|---|
| DE | 102009029333 A1 | 3/2011 |
| EP | 1127535 A2 | 8/2001 |
| EP | 1127535 A3 | 5/2002 |
| WO | 99/34632 A1 | 7/1999 |

OTHER PUBLICATIONS

International Search Report for PCT/IT2015/000008 dated Jun. 15, 2015.
Italian Patent Office Search Report and Written Opinion dated Oct. 15, 2014 (partially in English).
Letter from Italian Patent Office dated Oct. 21, 2014.
Swook Hann et al., White LED Ceiling Lights Positioning Systems for Optical Wireless Indoor Applications, European Conference and Exhibition on Optical Communication (ECOC) 2010, Sep. 19-23, 2010, Torino, Italy.

(Continued)

*Primary Examiner* — Dao L Phan
(74) *Attorney, Agent, or Firm* — Hedman & Costigan, P.C.; James V. Costigan; Kathleen A. Costigan

(57) ABSTRACT

Method for estimating the position of a portable device which includes:
- a first estimation step (11), in which is estimated the position and the extension of a first spatial region (100) where the portable device is located and;
- a second estimation step (12), in which is estimated the position of the portable device by the selection of the position where the portable device is located among the positions included in the first spatial region (100).

9 Claims, 3 Drawing Sheets

(56) References Cited

OTHER PUBLICATIONS

Figure 1:
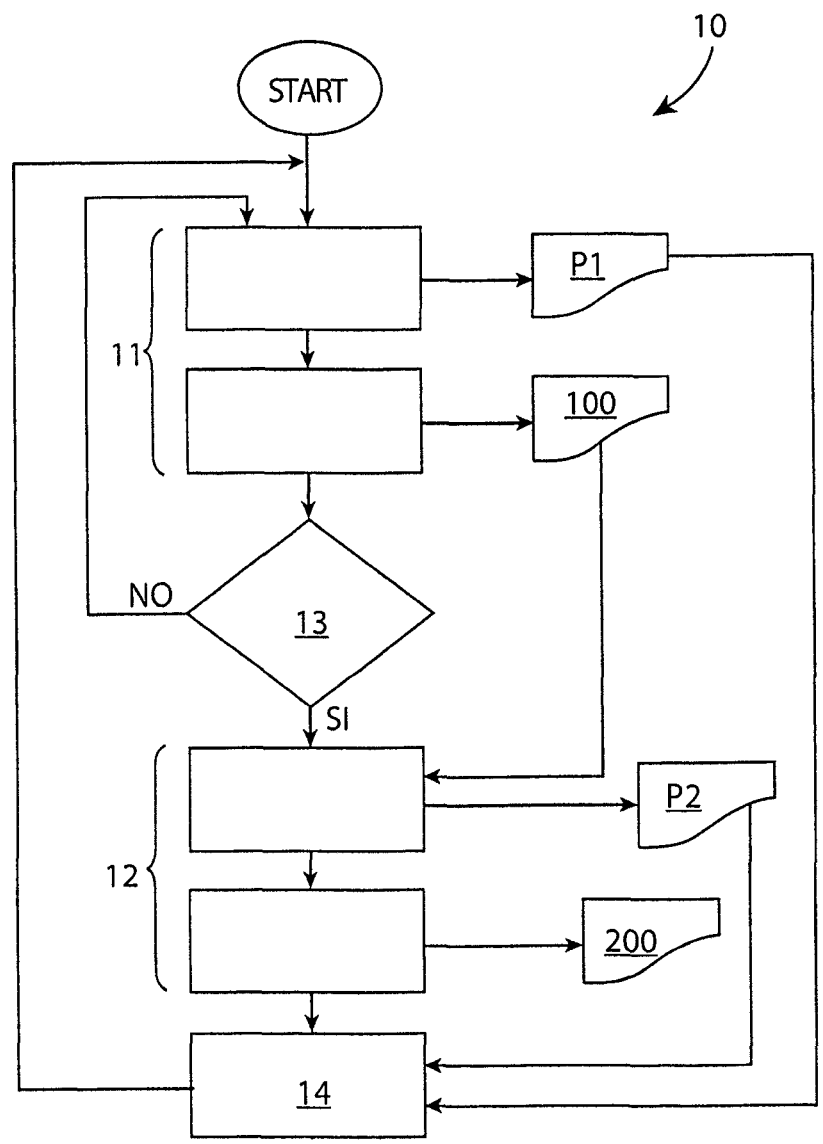

Etienne Le Grand et al., 3-Axis Magnetic Field Mapping and Fusion for Indoor Localization, 2012 IEEE International Conference on Multisensor Fusion and Integration for Intelligent Systems (MFI), Sep. 13-15, 2012, pp. 358-364, Hamburg, Germany.

Atri Mandal et al., Beep: 3D Indoor Positioning Using Audible Sound, IEEEE Consumer Communications and Networking Conference, 2005, pp. 348-353.

Mohamed Ibrahim et al., CellSense: An Accurate Energy-Efficient GSM Positioning System, IEEE Transactions on Vehicular Technology, 2012, vol. 61.

Yin Lou et al., Map-Matching for Low-Sampling-Rate GPS Trajectories, ACM GIS '09, Nov. 4-6, 2009, Seattle, WA.

Paramvir Bahl et al., RADAR: An In-Building RF-Based User Location and Tracking System, INFOCOM 2000 Nineteenth Annual Joint Conference of the IEEE Computer and Communications Societies., pp. 775-784, vol. 2.

Carsten Fritsche et al., Hybrid GPS/GSM Localization of Mobile Terminals Using the Extended Kalman Filter, 6th Workshop on Positioning, Navigation and Communication 2009 (WPNC '09), pp. 189-194, IEEE.

Hisato Kawaji et al., Image-Based Indoor Positioning System: Fast Image Matching Using Omnidirectional Panoramic Images, 1st ACM international workshop on Multimodal pervasive video analysis, 2010.

Frédéric Evennou, et al., Map-Aided Indoor Mobile Positioning System Using Particle Filter, Wireless Communications and Networking Conference, 2005, pp. 2490-2494, vol. 4, IEEE 2005.

S. Suksakulchai et al., Mobile Robot Localization Using an Electronic Compass for Corridor Environment, Systems, Man, and Cybernetics, 2000 IEEE International Conference, vol. 5, IEEE 2000.

Jussi Collin et al., Indoor Positioning System Using Accelerometry and High Accuracy Heading Sensors, GPS/GNSS 2003 Conference (Session C3), Sep. 9-12, 2003, Portland, OR, The Institute of Navigation.

METHOD FOR ESTIMATING THE POSITION OF A PORTABLE DEVICE

The present invention relates to a method for estimating the position of a portable device.

Particularly, the present invention relates to a method for estimating the position of an electronic portable design such as a smart phone and like.

Particularly, the present invention concerns a method for estimating the position of a portable device within buildings, and more generally within closed environments.

Present estimation method is particularly suitable for estimating the position of a portable device within a building with a plurality of floors.

Therefore, the present invention is included within the geo-localization systems.

A known method for estimating the position is described in the U.S. patent application us2013053062.

A method and an apparatus are described in the above application for estimating the position of a plurality of first positions by a plurality of units for estimating the position implementing corresponding estimation of positions, then providing a second position of the portable device estimated on the basis of the first positions.

Said traditional method has a drawback due to the fact that it requires a high calculation power to obtain a reliable timely estimation.

The challenge faced by the present invention is that of reducing the calculation power required for estimating the position of a portable device.

Object of the present invention is that of solving the above problem.

To this end, an object of the present invention is that of permitting obtaining estimation of the position more quickly that the above traditional method, with the same calculation power available to estimate the position.

Another object of the present invention is that of providing a method for estimating the position that is more flexible than the traditional estimation methods, thus permitting a reliable estimation of the position within a range of environmental conditions larger than the traditional methods described in the above.

Still another object of the present invention is that of providing a method for estimating the position which is solid, i.e. permitting estimating the position of a portable device under different environmental conditions.

The above object, as well as other objects that will be clearer in the following, are obtained by a method for estimating the position of a portable device according to the enclosed claim 1.

Detailed features of the method for estimating the position of a portable device according to the invention are described in the dependent claims.

Figure 2:
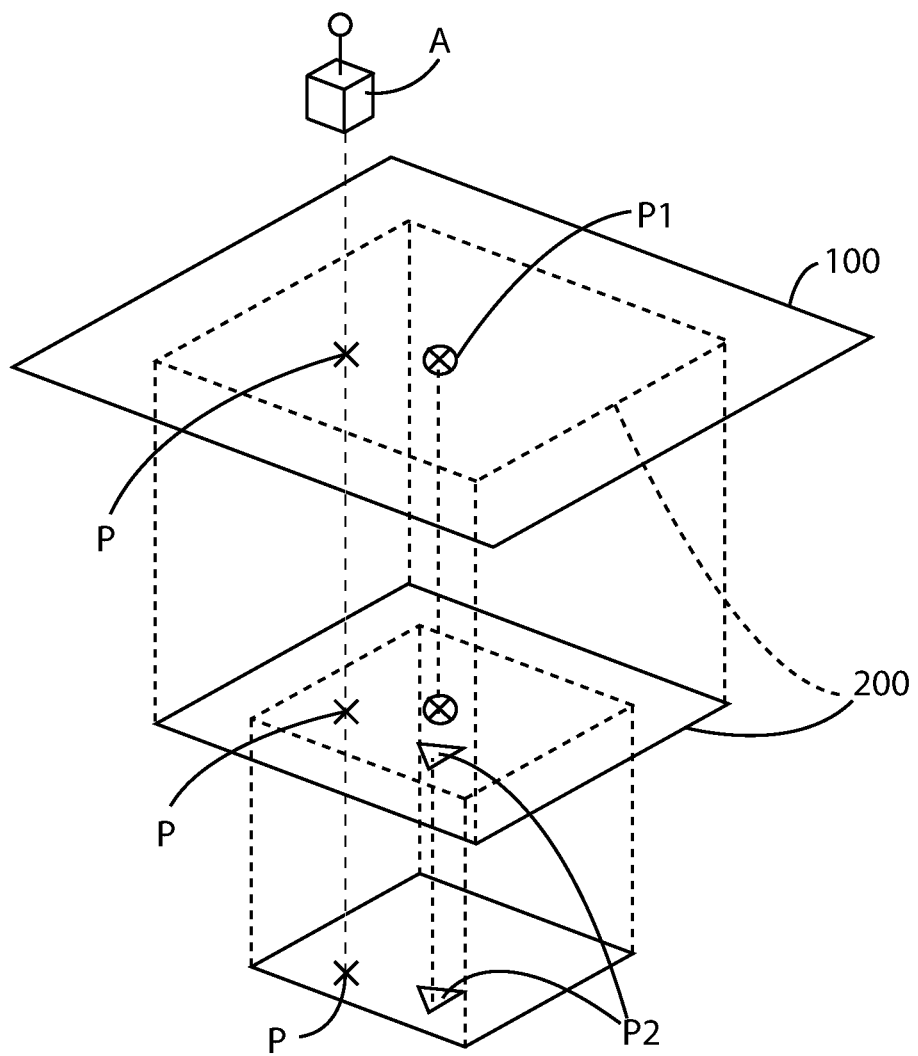
Figure 3:
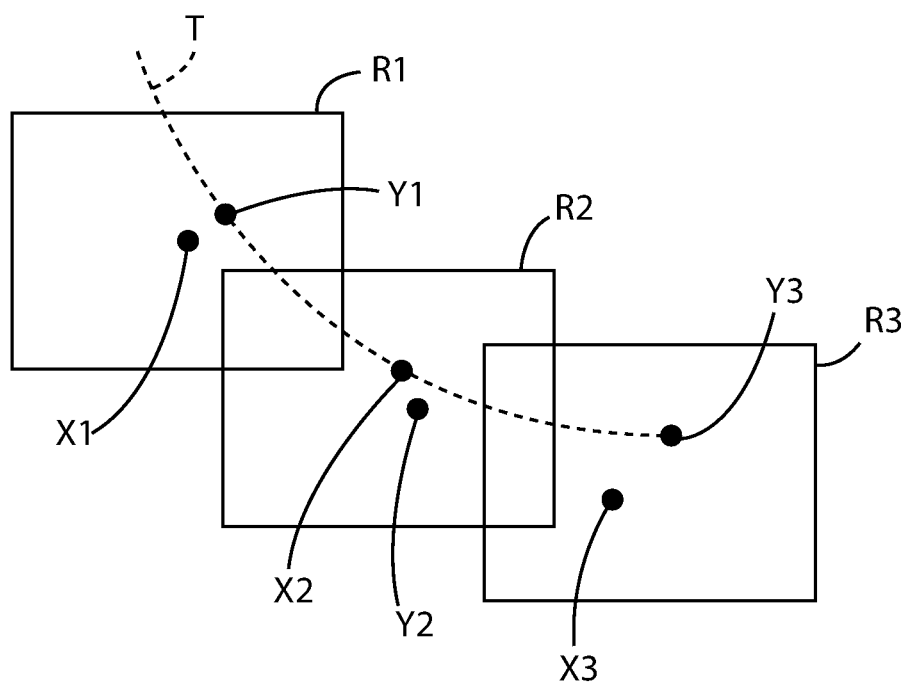

Further features and advantages of the invention will be clearer from the specification of a preferred, but not exclusive, embodiment of a method for estimating the position of a portable device according to the invention, illustrated for illustrative, but not limitative, purposes in the enclosed drawings, wherein:

FIG. 1 shows a flowchart representing a method according to the invention;

FIG. 2 schematically shows two subsequent estimation steps of the method of FIG. 1;

FIG. 3 schematically shows an example of application of the method for estimating the position according to the present invention.

Making particular reference to the above figures, it is generically indicated by reference 10 a method for estimating the position of a portable device A that, according to the invention, has a particular peculiarity in comprising:

a first estimation step 11, providing estimating the position an and the extension of a first spatial region 100 within which the portable device A is located;

a second estimation step 12 providing estimating the position P of the portable device A, selecting the same among positions included within the first spatial region 100.

In order to obtain a high estimation speed with reduced calculation resources, preferably second estimation step provides that, in order to estimate position P, only positions included within the first spatial region 100 are examined.

First and second estimation steps are advantageously actuated automatically by an electronic device.

Advantageously, by position of a spatial region it is meant geometric barycenter of positions included within the same.

In other words, a portable device actuating the method for estimating the position according to the present invention preferably makes and updates during the time the following estimations:

a position and extension estimation of a spatial region within which the portable device is localized;

an estimation of the position of the portable device within the above spatial region.

When the portable device is displaced, spatial region correspondingly moves.

For example, first estimation step 11 can be actuated by a GPS localization system that, according to the present invention, is used for estimating the position and the extension of the first spatial region 100 within which position P of the portable device A is located. According to said example, second estimation step 12 can be actuated by a Wi-Fi localization system received by the latter.

Said Wi-Fi localization system, according to the present invention, estimates position P of the portable device A by selecting a position P2 of the portable device A among those included within the first spatial region 100.

In FIG. 2 it is indicated the real position of portable device A and by P1 and O2 two positions estimated by the method according to the present invention.

Position and extension of the spatial region can be estimated in different ways.

In an advantageous embodiment of the present invention, a GPS system can be used to make the first estimation step.

A series of positions X1, X2 and X3 detected by GOS system according to a time succession are shown in FIG. 3.

Preferably, method for estimating according to the present invention provides actuating a map match technique, which is per se traditional, so as to estimate a trajectory T along which it is estimated that portable device A moved.

According to said embodiment of the invention, first estimation step provides that said GPS system estimates according to a time succession a plurality of spatial regions R1, R2 and R3 in which portable device is localized time by time.

In other words, during the first estimation step, for every time moment t1, t2, t3, GPS system respectively estimates a position X1, X2, X3 of portable device A and a spatial region R1, R2 and R3.

According to the present embodiment, second estimation step provides estimating within said spatial regions R1, R2 and R3, position of portable device A, thus obtaining estimated positions Y1, Y2 and Y3.

Preferably, estimation method according to the present invention provides actuating a map match technique, which is per se traditional, so as to estimate a trajectory T along which it is estimated that portable device A moved.

Said map match technique is for example described in Yin Lou et al. "Map Matching for Low-Sampling Rate GPS Trajectories" in ACM GIS '9, Nov. 4-6, 2009, Seattle, Wash., USA ISBN 978-1-60558-649-6).

Another embodiment of the present invention can provide the use of a localization technique based on GSM Cell-ID, much less precise with respect to a system based on GPS.

In this case, method for estimating the position according to the present invention preferably provides estimating displacement trajectory of portable device A by using a clustering algorithm to cluster positions that temporally and spatially are close and to use the centre of clusters comprised of groups of said positions to estimate the position of the spatial regions.

Advantageously, first estimation step 11 is carried out by first estimation means and second estimation step 12 is carried out by second estimation means independent with respect to said first estimation means.

First estimation step 11 preferably provides also to estimate the position of the portable device A.

Making reference to FIG. 1, estimation of the position made in the first estimation step 11 is indicated by P1 and estimation made in second estimation step 12 is indicted by P2.

Precision of estimation of said position P1 provided in first estimation step 11 is preferably lower than estimation of said position P2 provided in second estimation step 12.

In other words, estimation made in second estimation step 12 is advantageously more precise than estimation made during first estimation step 11 so as to provide estimation of the position of the portable device always more precise.

According to the present invention, localization method preferably comprises a verification step 13 during which operability of estimations means is verified and advantageously it operates them as follows:
- if second estimations means are not operative, then position of portable device A is estimated by first estimation means;
- if second estimation means are operative, then position is estimated by second estimation means.

In other words, a portable device a provided with first and second estimation means and implementing the localization method according to the present invention advantageously verifies if second estimation means are operative, which preferably make a more accurate estimation of the position, and in the positive uses the latter to make the estimation of the position, otherwise, if second estimation means are not operative, it makes estimation of the position of portable device A by the first estimation means.

Advantageously, present method provides a memorization step 14 of the estimation of position of portable device A.

Preferably, estimation method according to the present invention further comprises the steps of detecting parameters useful to localize the device, preferably comprising:
- displacement speed of portable device that preferably is average speed of displacement of portable device calculated within a set time period;
- and/or displacement direction;
- and/or displacement trajectory detected within a set time period.

Memorization step 14 advantageously provides memorization of the above parameters.

Further, present estimation method preferably also comprises a step of estimation of the displacement of the portable device A.

Advantageously, estimation method according to the present invention provides that, if both first and second estimation means are not operative, or if estimation means are not operative suitable for estimating absolute position of portable device A, above estimation steps provide calculating position of portable device A by applying displacement estimated during said step of estimation of displacement to the last stored position of the portable device A.

To this end, portable device A will be advantageously provided with displacement estimation means, such as accelerometers and/or gyroscopes.

Method according to the present invention advantageously provides that at least one of the estimation steps comprises an estimation step carried out by extrapolation of the position of portable device A.

Said extrapolation estimate step comprises extrapolation of the position of portable device A on the basis of the above mentioned parameters, and preferably on the basis:
- of the previous positions of portable device A stored during memorization step 14:
- and/or on the basis of at least an information about speed and direction of portable device A stored during the memorization step 14.

First estimation step 11 preferably provides selecting, on the basis of a set before criteria, first estimation means among a plurality of first estimation means, which are different each other as far as position estimation mode is concerned.

Second estimation step 12 advantageously provides selecting, on the basis of a set before criteria, second estimation means among a plurality of second estimation means, which are different each other as far as position estimation mode is concerned.

For example, according to the present invention, groups or clusters of estimation means can be provided.

Each group comprises a plurality of estimation mean grouped according to a set criterion.

Preferably, said criterion is based on precision of estimation of position that can be made by each estimation means.

Advantageously, estimation means will belong to each group with a precision included within a set range.

In alternative embodiments of the present invention, clustering criteria of estimation means can be different with respect to the criteria based on the above mentioned precision value and, for example, it can be based on calculation resources necessary to make the position estimation.

Above estimation means are suitable to actuate traditional localization techniques, and therefore will be not described in detail.

For exemplificative, but not exhaustive, purposes, estimation means may comprise means suitable to actuate the method for estimating the position, per se already known, based on interpretation of geomagnetic field described in Etienne Le Grand et al. "3-Axis Magnetic Field Mapping and Fusion for Indoor Localization" in proceedings of 2012 IEEE International Conference on Multisensor Fusion and Integration for Intelligent Systems (MFI) Sep. 13-15, 2012 Hamburg, Germany.

Estimation means described can comprise means suitable to actuate localization method by analyses of Wi-Fi signals described in Bahl, P. et al. "Radar: an in-building RF-based user location and tracking system", published in INFOCOM 2000 Nineteenth Annual Joint Conference of the IEEE Computer and Communications Societies.

Advantageously, according to the present invention, above methods applied to the second estimation step 12 or the present method for estimating the position provide selecting the position of the portable device among the sole positions comprised within the spatial region estimated in first estimation step 11, so as to drastically reduce time necessary to make the estimation of the position with the same precision, or obtaining a drastic reduction with the same time required for obtaining said estimation.

Further, second step preferably also comprises estimating position and extension of a second spatial region 200, in which portable device A is located.

Advantageously, estimation of the second spatial region 200 provides selecting a sub-cluster of position included within the first spatial region 100, said sub-cluster defining said second spatial region 200, thus drastically reducing calculation capability necessary to estimate the second spatial region 200, with respect to the case in which an absolute estimation of the same is carried out, i.e. not limited to a spatial region defined before.

Preferably, spatial regions are continuous, and not discrete, assemblies of positions that can be taken by portable device A.

In a preferred embodiment of the method for estimating the position according to the present invention, spatial regions are comprised of continuous assemblies of positions if they have dimensions lower than a set before limit extension, and are discrete assemblies of positions if they have dimensions larger the limit extensions.

Therefore, selection made during second step advantageously comprises a localization of the portable device limited to within the first spatial region.

By estimating a spatial region in the present specification it is meant, to be clear and concise, the estimation of the position and of the extension of the same spatial region.

First 11 and second 12 estimation steps are preferably cyclically repeated one after the other at set time intervals, so as to obtain a continuous updating of the position of portable device A.

According to the present invention, method for estimating the position of a portable device A advantageously provides that, during each first estimation step 11 it follows a second estimation step 12, estimation of the position of the first spatial region 110 comprising the selection of one of the positions comprised within the second spatial region 200 estimated during the second estimation step 12, so as to largely limit calculation power necessary with respect to traditional methods providing absolute estimation of a position of a portable device not limited to a delimited spatial region.

In other words, in each estimation step it is carried out estimation of the position and extension of a spatial region 100 or 200 within which time by time it is positioned portable device A and each spatial region is employed in the following estimation step as an assembly of positions among which selecting the estimated position of the portable device A.

For exemplificative, but not exhaustive purposes, three estimation means groups can be provided, divided on the basis of the precision of the position estimation that they can give.

A first group of estimation means can comprise localization means of the GNSS (Global Navigation Satellite System) type, i.e. GPS localization means, localization means employing the system known as GALILEO, localization means using the system GLONASS, as well as localization means, standard per se, using radio signals with GSM or UMTS or LTE standard, or FM or AM signals.

Estimation means of said first group are suitable to estimate the position of the localization apparatus in open spaces, close to buildings or in correspondence of the inner/outer perimeter of buildings.

Traditional localization techniques that can be, mutatis mutandi, actuated by localization means of the above first group can be those described in:
Ibrahim M. at al. "CellSense: An Accurate Energy-Efficient GSM Positioning System" published in IEEE Transactions on Vehicular Technology, Volume 61, 2012,
Fritsche C. et al. "Hybrid GPS/GSM localization of mobile terminals using the extended Kalman filter" published in $6^{th}$ Workshop on Positioning; navigation and Communication, 2009. WPNC 2009.

A second group of estimation means can for example comprise localization means employing radio-frequency signals, or Wi-Fi signals emitted by suitable emitters provided in the zone where localization apparatus is located or estimation means employing the image capture for estimating position, or using light sensors or optical sensors.

Traditional localization techniques that can be, mutatis mutandis, actuated by localization means of the above second group can be those described in:
Bahl, P. et al. "RADAR an in-building RF-based user localization and tracking system", published in INFOCOM 2000. Nineteenth Annual Joint Conference of the IEEE Computer and Communication Societies Proceedings. IEEE, Vol. 2.
Evennou, F. et al. "Map-aided indoor mobile positioning system using particle filter, published in Wireless Communications and Networking Conference, 2005 IEEE, Vol. 4.

A third group of estimation means can comprise localization means using radio-frequency signals, localization means using detection of local magnetic field, and particularly geo-magnetic field, or photographic images, or light signals, or sound signals, or localization means using traditional radio-frequency signals known as standard Bluetooth®, and preferably Bluetooth v4.0 signals and the next one (Bluetooth LE).

Traditional localization techniques that, mutatis mutandis, can be actuated by localization means of the above third group can be those described in:
Suksakulchai, S. et.al. "Mobile robot localization using an electronic compass for corridor environment" published in Systems, Man, and Cybernetics, 2000 IEEE International Conference Vol. 5;
Swook Hann et. al. "White LED ceiling lights positioning systems for optical wireless indoor applications" in proceedings of 36th European Conference and Exhibition on Optical Communication (ECOC), 2010.
Mandel, A. et. al. "Beep: 3D indoor positioning using audible sound" in proceedings of Second IEEE Consumer Communications and Networking Conference, 2005. CCNC. 2005.
Jussi Collin et. al. "Indoor positioning system using accelerometry and high accuracy heading sensors" in proceedings of GPS/GNSS 2003 Conference (Session C3), Portland, Oreg., Sep. 9-12, 2003
Hisato Kawaji et. al. "Image-based indoor positioning system: fast image matching using omnidirectional panoramic images" in proceedings of the 1st ACM international workshop on Multimodal pervasive video analysis, 2010

Etienne Le Grand et. al. "3-Axis Magnetic Field Mapping and Fusion for Indoor Localization", in proceedings of 2012 IEEE International Conference on Multisensor Fusion and Integration for Intelligent Systems (MFI) Sep. 13-15, 2012. Hamburg, Germany.

According to said example, method according to the present invention provides estimating position and extension of the first spatial region 100 by one of the estimation means of the first group, for example a GPS localization system, then verifying operability of one of the estimation means of the second group, for example a localization system based on Wi-Fi signals.

In case of positive verification, the position of the portable device within said first spatial region 100 is estimated by said Wi-Fi localization system.

Advantageously, second spatial region 200 is a subassembly of the positions contained within the first spatial region 100.

Position of the portable device A is thus estimated by estimation means of the third group, for example a geomagnetic localization system that, according to the present invention, will carry out an estimation of the position of the portable device within the second spatial region 200.

Method for estimating the position according to the present invention permits overcoming localization problems of traditional localization methods using geomagnetic field: it is in fact known that distribution of geomagnetic field affected by anomalies present in closed spaces can be such that same distributions of geomagnetic field are present in different positions, causing errors of localization carried out by traditional methods.

Estimation of position limited to inside the spatial regions provided by method for estimating the position according to the present invention drastically reduces probability that said errors occur and thus it is remarkably increased reliability of the use of localization techniques based on geomagnetic field used in the present method for estimating the position.

In alternative embodiments of the invention, it could be provided a number of groups of estimation means higher than three and organized according to a set before hierarchy wherein, according to the present invention, estimation means of a group hierarchically lower estimate position of portable device within the spatial region having estimation means of a hierarchically upper group.

In other words, according to the present invention, estimation of the position of the portable device A is advantageously defined by subsequent estimations made by estimation means belonging to groups always more hierarchically lower.

Advantageously, method for estimating the position according to the present invention provides a step of setting a hierarchical limit to limit the position estimate.

Substantially, the setting step of said hierarchic limit consists of the definition of a limit group.

Advantageously, in case said hierarchic limit is set, estimation step 11 or 12 that would use estimation means of hierarchically lower groups with respect to said limit group is inhibited.

Generally speaking, method for estimating the position according to the present invention advantageously provides inhibiting, by the operator control, one selected between estimation steps 11 or 12 to limit calculation resources necessary to carry out said estimation method.

Said operation of inhibition of the selected estimation step preferably comprises a step of setting selected estimation means in the not operative mode.

Substantially, when the selected estimation step is inhibited, method according to the present invention provides that the use of estimation means belonging to groups always more hierarchically lower, as said before, is limited to the limit group.

Estimation step that would provide estimation means belonging to a group with a hierarchy lower than the limit group is inhibited since these estimation means are set as not operative.

In other words, a portable device implementing the method for estimating the position according to the present invention can be set in such a way that some of the estimation means it is provided with, so as to limit calculation capability required and thus to increase speed of estimation of position of portable device. An advantage of the method according to the invention is that of being particularly flexible, i. e. permitting limiting estimation operations at a set level of the above hierarchy, for example when a particular condition is present.

Said particular condition can, for example, provide that last estimation of the portable device position has a set before precision sufficient and thus it is not necessary making estimation of the position by further estimation means, or, particularly, more precise means.

In fact, in this case, having already obtained an acceptable estimation of the position, it is possible inhibiting the following estimation steps to free computational resources of the portable device.

With respect to the traditional methods for estimating the position, method described in the enclosed claims permits obtaining main advantage of permitting an estimation of the position of the portable device as more precise as possible as a function of the operative estimation means although requiring a reduced calculation power since, apart from an initial estimation step, every estimation step limits positions analyzed to estimate the position of the portable device A, to positions included within a spatial region defined during the previous estimation step.

Advantageously, extension of each spatial region will be obtained as a function of the precision of the estimation means used to determine the same.

A further advantage of the method for estimating the position according to the present invention is that of being particularly solid, i.e. able to provide an estimation of positions even under adverse conditions and only with some estimation means operative.

In this case, according to the present invention, present estimation method can provide an estimation of the position obtained by estimation of the position carried out by more precise operative estimation means.

Time passing between subsequent cycles of repetition of the above estimation steps, according to the present invention can be set or, in a preferred embodiment of the present invention, can be automatically varied as a function of the spatial distance between two positions estimated in succession.

Practically, frequency of repetition of said cycles will be proportional to spatial distance of two positions of portable device an estimated according to a time succession.

A method for estimating the position of a portable device according to the present invention has the advantage of not requiring infrastructures as required by traditional systems based on inside GPS repeaters to estimate the position within buildings or other closed spaces, thus reducing with respect to said traditional systems managing costs and remarkably increasing its use flexibility.

Further, method for estimating the position according to the present invention provides, before verifying among the estimation means, provided in the portable device, if some of them are operative and thus employing operative estimation means among those verified to estimate the position of the portable device.

Method for estimating the position according to the present invention eliminates ambiguity of the traditional localization systems based on detection of geomagnetic fields.

Further, present method requires computational resources much lower than traditional methods with the same precision of estimation of the position that can be obtained.

Advantageously, method according to the present invention provides possibility of excluding second step by hand command.

In other words, method for estimating the position according to the present invention advantageously provides a selection step carried out by the operator, of the estimation means to be employed to estimate the position of the portable device.

The invention claimed is:

1. Method for estimating the position of a portable device (A), which comprises:
    a first estimation step (11), in which is estimated the position and the extension of a first spatial region (100) where is located said portable device (A);
    a second estimation step (12), in which is estimated the position of said portable device (A); said second estimation step (12) comprises the selection of said position among the positions included in said first spatial region (100); said first estimation step (11) also providing to estimate said position of the portable device (A);
    said first estimation step (11) being performed by first estimating means and said second estimation step (12) being performed by second estimation means which are independent with respect to said first estimation means;
    the accuracy of the estimation of the position provided in said first estimation step (11) is lower than the accuracy of the estimation of the position estimated in said second estimation step (12),
    when the portable device is displaced, spatial region correspondingly moves;
    characterized in that said first estimation step and said second estimation step are both performed and updated during time.

2. A method for estimating the position according to claim 1 characterized in that it comprises a step of verifying the efficiency of said estimating means and by the fact that :
    if the second means of estimation is not operative then said position of the portable device (A) is estimated by said first means;
    if the second estimation means is operative then this position is estimated by said second means of estimation.

3. A method for estimating the position according to claim 1 characterized in that said first estimation step (11) provides to select, according to a predetermined criterion, said first estimation means among a plurality of first estimating means, which differ from one another by the position estimating way.

4. A method for estimating the position according to claim 1 characterized in that said second estimation step (12) provides to select, according to a predetermined criterion, said second means of estimation between a plurality of second estimating means which differ from one another by the position estimating way.

5. A method for estimating the position according to claim 1 characterized in that said second step also comprises to estimate the position and extension of a second spatial region (200), in which is located said portable device (A).

6. A method according to claim 5 characterized in that the estimation of said second spatial region (200) comprises the selection of a subset of positions included in said first spatial region (100), said subset defining said second spatial region (200).

7. A method according to claim 1 characterized in that said first and second estimation step (11, 12) are cyclically repeated in succession at predefined time intervals.

8. A method according to claim 6 characterized by the fact that, within each first estimation step (11) which follows a second estimation step (12), the estimation of the position of said first spatial region (100) consists in the selection of one of the positions included in the second spatial region (200) estimated in a second phase.

9. A method according to claim 7 characterized by comprising to inhibit a selected one of said estimation steps (11, 12) to reduce the computing resources necessary for the performing said method.

* * * * *